United States Patent
Zhang et al.

(10) Patent No.: US 10,467,291 B2
(45) Date of Patent: Nov. 5, 2019

(54) METHOD AND SYSTEM FOR PROVIDING QUERY SUGGESTIONS

(71) Applicant: Yahoo Holdings, Inc., Sunnyvale, CA (US)

(72) Inventors: Yuan Zhang, Milpitas, CA (US); Zhongqiang Chen, San Jose, CA (US); Shenhong Zhu, Santa Clara, CA (US)

(73) Assignee: Oath Inc., New York, NY (US)

( * ) Notice: Subject to any disclaimer, the term of this patent is extended or adjusted under 35 U.S.C. 154(b) by 277 days.

(21) Appl. No.: 15/144,196

(22) Filed: May 2, 2016

(65) Prior Publication Data
US 2017/0316023 A1    Nov. 2, 2017

(51) Int. Cl.
| | | |
|---|---|---|
| G06F 16/00 | (2019.01) | |
| G06F 16/9032 | (2019.01) | |
| G06F 3/0482 | (2013.01) | |
| G06F 16/951 | (2019.01) | |

(52) U.S. Cl.
CPC ...... *G06F 16/90324* (2019.01); *G06F 3/0482* (2013.01); *G06F 16/951* (2019.01)

(58) Field of Classification Search
CPC ............. G06F 17/30864; G06F 3/0482; G06F 17/30705; G06F 17/3064; G06F 17/30675; G06F 17/30613; G06F 17/30657; G06F 17/3066; G06F 17/3097; G06F 17/30; G06F 17/90324; G06F 16/951; G06F 16/90324; G06F 16/00
See application file for complete search history.

(56) References Cited

U.S. PATENT DOCUMENTS

| | | | | |
|---|---|---|---|---|
| 5,418,717 | A * | 5/1995 | Su | G06F 17/271 704/9 |
| 8,700,621 | B1 * | 4/2014 | Choi | G06F 16/3322 707/730 |
| 8,868,591 | B1 * | 10/2014 | Finkelstein | G06F 16/3322 707/767 |
| 9,195,706 | B1 * | 11/2015 | Finkelstein | G06F 17/30395 707/E17.009 |
| 9,600,833 | B1 * | 3/2017 | Hiller | G06Q 30/00 707/E17.074 |
| 2004/0186827 | A1 * | 9/2004 | Anick | G06F 17/30646 707/E17.064 |
| 2004/0249801 | A1 * | 12/2004 | Kapur | G06F 16/951 707/E17.107 |
| 2007/0118512 | A1 * | 5/2007 | Riley | G06F 16/3338 707/E17.108 |
| 2007/0150260 | A1 * | 6/2007 | Lee | G06F 17/2818 704/2 |
| 2008/0263032 | A1 * | 10/2008 | Vailaya | G06F 16/334 707/E17.017 |

(Continued)

*Primary Examiner* — Anh Ly
(74) *Attorney, Agent, or Firm* — Pillsbury Winthrop Shaw Pittman LLP

(57) ABSTRACT

The present teaching relates to providing query suggestions. A query is received from a user. A plurality of suggestions with respect to the query are obtained. One or more garbled suggestions are identified from the plurality of suggestions. One or more identified garbled suggestions are removed from the plurality of suggestions. The plurality of suggestions with removed one or more garbled suggestions are provided to the user in response to the query.

20 Claims, 16 Drawing Sheets

(56) References Cited

U.S. PATENT DOCUMENTS

| | | | | |
|---|---|---|---|---|
| 2009/0106224 A1* | 4/2009 | Roulland | G06F 17/30646 | 707/E17.071 |
| 2009/0171929 A1* | 7/2009 | Jing | G06F 16/3322 | 707/E17.017 |
| 2010/0211588 A1* | 8/2010 | Jiang | G06F 17/30637 | 707/768 |
| 2011/0161311 A1* | 6/2011 | Mishne | G06F 16/951 | 707/719 |
| 2011/0167064 A1* | 7/2011 | Achtermann | G06F 16/285 | 707/737 |
| 2011/0258212 A1* | 10/2011 | Lu | G06F 17/30864 | 707/760 |
| 2011/0307469 A1* | 12/2011 | Ghosh | G06F 17/30389 | 707/711 |
| 2011/0320470 A1* | 12/2011 | Williams | G06F 16/951 | 707/767 |
| 2012/0284253 A9* | 11/2012 | Ghosh | G06F 17/30389 | 707/711 |
| 2013/0282682 A1* | 10/2013 | Batraski | G06F 17/30864 | 707/706 |
| 2013/0282702 A1* | 10/2013 | Zhu | G06F 17/3064 | 707/723 |
| 2014/0074812 A1* | 3/2014 | Ruhela | G06F 17/30038 | 707/706 |
| 2014/0172821 A1* | 6/2014 | Hu | G06F 17/30867 | 707/711 |
| 2014/0222780 A1* | 8/2014 | Wu | G06F 17/30398 | 707/722 |
| 2014/0280179 A1* | 9/2014 | Coleman | G06F 17/30643 | 707/740 |
| 2015/0286708 A1* | 10/2015 | Tao | G06F 16/334 | 707/730 |
| 2016/0004773 A1* | 1/2016 | Jannink | G06F 17/30778 | 707/741 |
| 2016/0099892 A1* | 4/2016 | Palakovich | H04L 51/04 | 709/206 |
| 2016/0124951 A1* | 5/2016 | Barker | G06F 16/24522 | 706/12 |
| 2016/0170962 A1* | 6/2016 | Johnson | G06F 16/288 | 704/9 |
| 2016/0217181 A1* | 7/2016 | Kadouch | G06F 16/951 | |
| 2017/0024424 A1* | 1/2017 | Almohizea | G06F 17/30327 | 707/760 |
| 2017/0161373 A1* | 6/2017 | Goyal | G06F 17/30705 | 707/760 |
| 2018/0081964 A1* | 3/2018 | Su | G06F 17/30696 | 707/760 |

* cited by examiner

| Single repeat garbled suggestion | Multiple repeat garbled suggestion |
|---|---|
| forum data info info | account net zero account net |
| game yahoo launch game | NFL playoff prediction playoff NFL |
| cakes pictures birthday cakes | oak park district park district softball |
| walmart frozen castle walmart | nursing theory advanced nursing theory book |
| iphone complaints apple iphone | gmail correo gmail account gmail correo electronic |
| kerbal space program wiki kerbal | login welcome google google gmail homepage gmail account |
| facebook fandango fedex fedex tracking | scottrade login scottrade login investors scottrade |

| Conjunction Word | Examples |
|---|---|
| to | face to face, door to door, month to month |
| by | step by step, side by side, day by day |
| and | half and half, time and time, bye and bye |
| & | johnson & johnson, brown & brown, lock & lock |
| on | one on one, hop on hop, wave on wave |
| in | Hand in hand, blood in blood, inches in inches |
| of | best of best, king of king, friends of friends |

| Input | air force wallpaper air force | best love poems love poems quotes |
|---|---|---|
| POS | air/NN force/NN wallpaper/NN air/NN force/NN | best/JJS love/NN poems/NN love/VVP poems/NNS quotes/NNS |
| Meaning groups | air force \| wallpaper \| air force | best love poems \| love poems quotes |
| Decision | two meaning groups are lexically the same -- garble | two groups are not the same -- non-garble |

FIG. 8

METHOD AND SYSTEM FOR PROVIDING QUERY SUGGESTIONS

BACKGROUND

1. Technical Field

The present teaching relates to methods, systems, and programming for providing query suggestions over the internet. In particular, the present teaching relates to methods, systems, and programming for providing query suggestions by filtering garbled suggestions.

2. Discussion of Technical Background

Search engines enable users to specify search interest and find the matching items to the specified search interest. The search interest refers to as a search query inputted by the user. A search query may be one or more words separated by white spaces that identify the desired text documents, web-resources, pictures, audio files, video files, and other formats of natural language. While the search query is typed by a user, search engines show the user a drop-down list with a plurality of complete query suggestions in accordance with the already typed letters, characters, and/or numbers. The drop-down list of query suggestions provides the user options to select a complete search query that mostly matches the user's search interest. Search engines obtain the candidate query suggestions from a suggestion database. Entries in the suggestion database are maintained using real-time user inputted queries and user selections of suggested queries. However, entries in the suggestion database, i.e., the query suggestions may not always provide meaningful suggestions to the users. Such query suggestions refer to as garbled suggestions and cause confusion to the users.

Therefore, there is a need to provide a solution to detect and remove the garbled suggestions to tackle the above-mentioned challenges.

SUMMARY

The present teaching relates to methods, systems, and programming for providing query suggestions over the internet. In particular, the present teaching relates to methods, systems, and programming for providing query suggestions by filtering garbled suggestions.

According to an embodiment of the present teaching, a method implemented on a computing device having at least one processor, storage, and a communication platform connected to a network for providing query suggestions comprises receiving a query from a user; obtaining a plurality of suggestions with respect to the query; identifying one or more garbled suggestions from the plurality of suggestions; removing the one or more garbled suggestions from the plurality of suggestions; and providing the plurality of suggestions with removed one or more garbled suggestions to the user in response to the query.

In some embodiments, identifying one or more garbled suggestions from the plurality of suggestions further comprises determining whether a suggestion of the plurality of suggestions comprises one repeated word; and when it is determined that the suggestion comprises one repeated word, generating a plurality of groups of words of the suggestion, each comprising an instance of the repeated word; determining a correlation among the plurality of groups of words; and determining whether the suggestion is a garbled suggestion based on the correlation.

In some embodiments, generating a plurality of groups of words of the suggestion further comprises assigning a part of speech (POS) tag to each word of the suggestion; and integrating one or more words to form a group based on the assigned POS tags.

In some embodiments, the correlation indicates whether two groups of words are connected via at least a conjunction word.

In some embodiments, identifying one or more garbled suggestions from the plurality of suggestions further comprises determining whether a suggestion of the plurality of suggestions comprises at least two repeated word; and when it is determined that the suggestion comprises at least two repeated words, determining whether the suggestion comprises at least one conjunction word; and if the suggestion comprises no conjunction word, generating a first set of groups of words of the suggestion, each comprising an instance of the at least two repeated words; transforming the first set of groups of words to a second set of groups of words; determining whether there are two identical groups of words from the second set of groups of words; if there are two identical groups of words from the second set of groups of words, determining that the suggestion is a garbled suggestion; and if there are no two identical groups of words from the second set of groups of words, determining that the suggestion is not a garbled suggestion.

In some embodiments, the method further comprises if the suggestion comprises at least one conjunction word, generating one or more segments of the suggestion separated by the at least one conjunction word; determining whether at least one of the one or more segments is a garbled segment; and when it is determined that at least one of the one or more segments is a garbled segment, determining that the suggestion is a garbled suggestion.

In some embodiments, determining whether at least one of the one or more segments is a garbled segment further comprises generating a first set of groups of words of the suggestion for each of the one or more segments, each comprising an instance of the at least two repeated words; transforming the first set of groups of words to a second set of groups of words; determining whether there are two identical groups of words from the second set of groups of words; if there are two identical groups of words from the second set of groups of words, determining that the segment is a garbled suggestion; and if there are no two identical groups of words from the second set of groups of words, determining that the segment is not a garbled suggestion.

According to another embodiment of the present teaching, a system having at least one processor, storage, and a communication platform for providing query suggestions comprises an interface implemented on the at least one processor and configured to receive a query from a user; a suggesting engine implemented on the at least one processor and configured to obtain a plurality of suggestions with respect to the query; and a garbled suggestion filter implemented on the at least one processor and configured to identify one or more garbled suggestions from the plurality of suggestions; and remove the one or more garbled suggestions from the plurality of suggestions, wherein the suggesting engine is further configured to provide the plurality of suggestions with removed one or more garbled suggestions to the user in response to the query.

According to yet another embodiment of the present teaching, a non-transitory machine-readable medium having information recorded thereon for providing query suggestions, wherein the information, when read by the machine, causes the machine to perform receiving a query from a user;

obtaining a plurality of suggestions with respect to the query; identifying one or more garbled suggestions from the plurality of suggestions; removing the one or more garbled suggestions from the plurality of suggestions; and providing the plurality of suggestions with removed one or more garbled suggestions to the user in response to the query.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 illustrates examples of garbled suggestions, according to an embodiment of the present teaching;

FIG. 7 illustrates examples of conjunction words, according to an embodiment of the present teaching;

FIG. 8 illustrates examples of determining the garbled suggestions, according to an embodiment of the present teaching;

DETAILED DESCRIPTION

Figure 1:
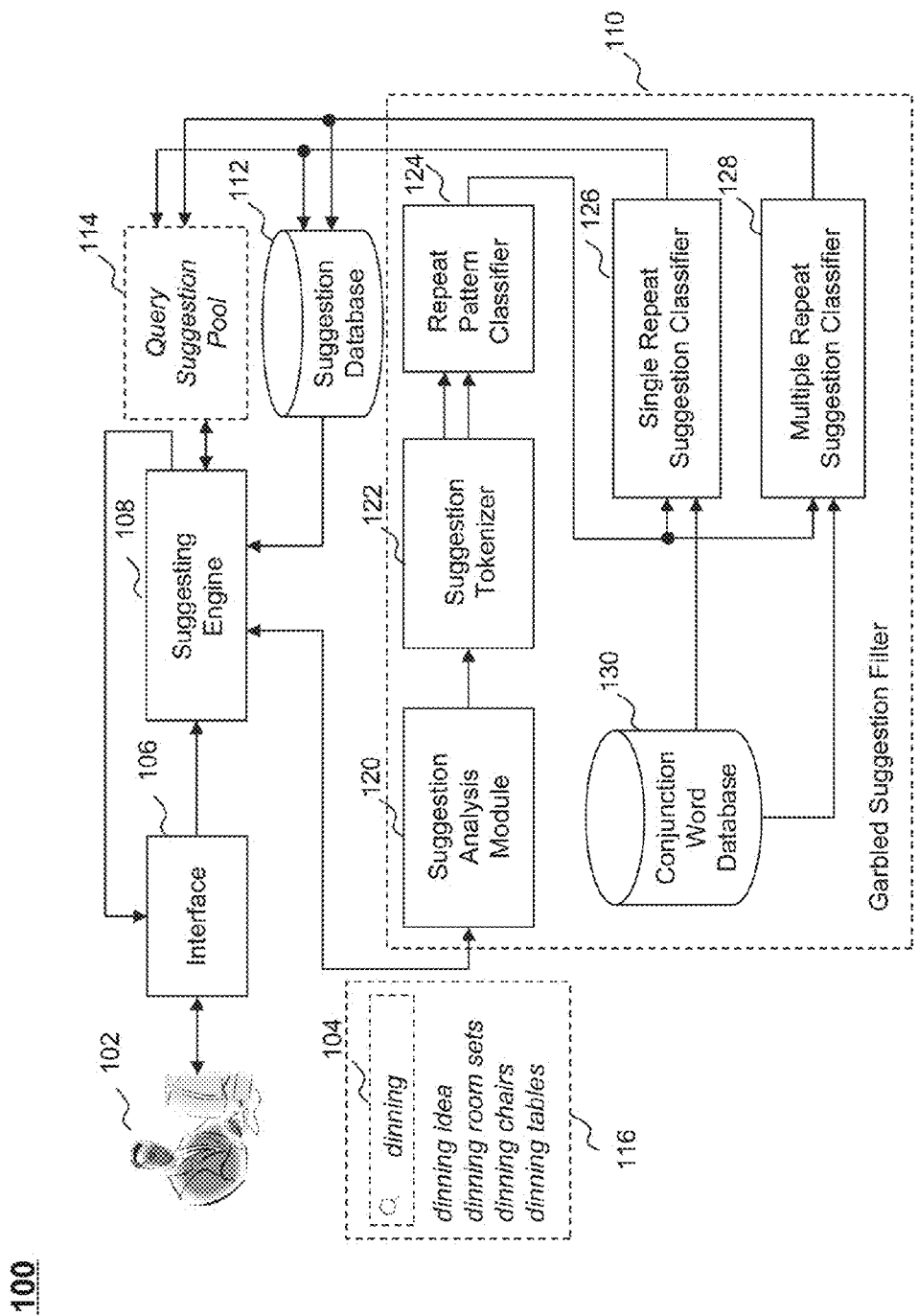
FIG. 1 illustrates an exemplary system diagram of providing query suggestions, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching focuses on identifying garbled suggestions before presenting the query suggestions to a user in response to a query typed by the user. The goal of the present teaching is to provide the user with meaningful and helpful suggestions related to a query inputted by the user. Data mining techniques are employed to identify garbled suggestions caused by sequences of repeated words. In particular, the present teaching proposes techniques to recognize repeated words that are syntactically connected by pivoted words. A query suggestion with one or more repeated words is divided into one or more groups of words, each having an instance of the one or more repeated words and conveying unique information intent. The present teaching explores the correlations among the divided groups and determines whether the query suggestion is a garbled suggestion based on the correlations among the divided groups. The present teaching improves relevance of the query suggestions and reduces the footprint of the suggestion database.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary system diagram of providing query suggestions, according to an embodiment of the present teaching. According to a system 100 of providing query suggestions, a user 102 types in a query 104 via an interface 106. Query 104 may be one or more words, numbers, special characters, pictures, audios, videos, etc.

Interface 106 may be any type of search engines implemented on internet browsers and/or mobile applications. Search query 104 received at interface 106 is forwarded to a suggesting engine 108. Suggesting engine 108 accesses a suggestion database 112 for candidate query suggestions that include query 104 and match the user's interest. In some embodiments, candidate query suggestions may include one or more synonyms of query 104. Suggesting engine 108 caches the candidate query suggestions in a query suggestion pool 114. At the meantime, the candidate query suggestions are forwarded to a garbled suggestion filter 110 to determine as to whether any candidate query suggestion provides meaningless information. Suggesting engine 108 receives the results from garbled suggestion filter 110 and removes the determined garbled suggestions from query suggestion pool 114. The query suggestions with the removed garbled suggestions are presented on interface 106 to user 102. As shown in FIG. 1, user 102 types "dining" and four query suggestions 116 are presented as "dining idea," "dining room sets," "dining chairs," and "dining tables."

Suggestion database 112 stores information related to a large amount of query suggestions that are collected over the internet for a period of time. Such information includes one or more query words associated with each query suggestion, user selections of each query suggestion, and user satisfaction of the selected query suggestion, etc. Information stored in suggestion database 112 is periodically updated based on real-time data related to user search behavior over the internet. In some embodiments, information stored in suggestion database 112 is updated dynamically based on the results from garbled suggestion filter 110 to ensure suggestion database 112 provides helpful information in response to user's search query. Suggestion database 112 may be connected to internet directly or indirectly via a server. In some embodiments, suggestion database 112 may serve as a back-end database to suggestion engine 108, a search engine, or a content recommending engine.

Garbled suggestion filter 110 may comprise a suggestion analysis module 120, a suggestion tokenizer 122, a repeat pattern classifier 124, a single repeat suggestion classifier 126, and a multiple repeat suggestion classifier 128, and a conjunction word database 130. Suggestion analysis module 120 is configured to receive the candidate query suggestions from suggesting engine 108 and analyze the word patterns of each candidate query suggestion. In some embodiments, suggestion analysis module 120 determines whether a candidate query suggestion demonstrates word repeating pattern. In some embodiments, suggestion analysis module 120 applies part of speech (POS) tags to each component of a candidate query suggestion. Suggestion tokenizer 122 is configured to break the stream of candidate query suggestion into words, phrases, characters, and/or other meaningful elements. In some embodiments, suggestion tokenizer 122 breaks the stream of candidate query suggestion into a plurality of words separated by whitespaces or punctuations. In some other embodiments, suggestion tokenizer 122 considers all contiguous of alphabetic characters as one token. In some other embodiments, suggestion tokenizer 122 considers all numbers as parts of one token. Repeat pattern classifier 124 is configured to determine the number of tokens being repeated in a candidate query suggestion, i.e., a single token being repeated or multiple tokens being repeated. Results from repeat pattern classifier 124 are further processed at single repeat suggestion classifier 126 if a single token is repeated, and at multiple repeat suggestion classifier 128 if multiple tokens are repeated.

Single repeat suggestion classifier 126 receives the candidate query suggestions that have single repeated token. For example, as shown in FIG. 2, candidate query suggestion "game yahoo launch game" has single token "game" being repeated. Single repeat suggestion classifier 126 is configured to determine as to whether a candidate query suggestion having a single repeated token is a garbled suggestion. Multiple repeat suggestion classifier 128 receives the candidate query suggestions that have multiple repeated tokens. For example, as showing in FIG. 2, candidate query suggestion "account net zero account net" has two tokens "account" and "net" being repeated. Multiple repeat suggestion classifier 128 is configured to determine as to whether a candidate query suggestion having multiple repeated tokens is a garbled suggestion. Single repeat suggestion classifier 126 and multiple repeat suggestion classifier 128 may access conjunction word database 130 and evaluate the candidate query suggestion based on the information provided by conjunction word database 130.

It should be appreciated that the examples of interface 106, suggesting engine 108, suggestion database 112, and garbled suggestion filter 110 as illustrated in FIG. 1 are for illustrative purpose. The present teaching is not intended to be limiting. System 100 may comprise one or more additional components to provide the user with garble-free query suggestions. Further, the examples of suggestion analysis module 120, suggestion tokenizer 122, repeat pattern classifier 124, single repeat suggestion classifier 126, multiple repeat suggestion classifier 128, and conjunction word database 130 as illustrated in FIG. 1 are for illustrative purpose. The present teaching is not intended to be limiting. Garbled suggestion filter 110 may comprise more or less components than illustrated. Single repeat suggestion classifier 126 and multiple repeat suggestion classifier 128 are illustrated as separate elements in FIG. 1. However, the present teaching is not intended to be limiting. Single repeat suggestion classifier 126 and multiple repeat suggestion classifier 128 may be integrated into one element according to some embodiments.

Figure 3:
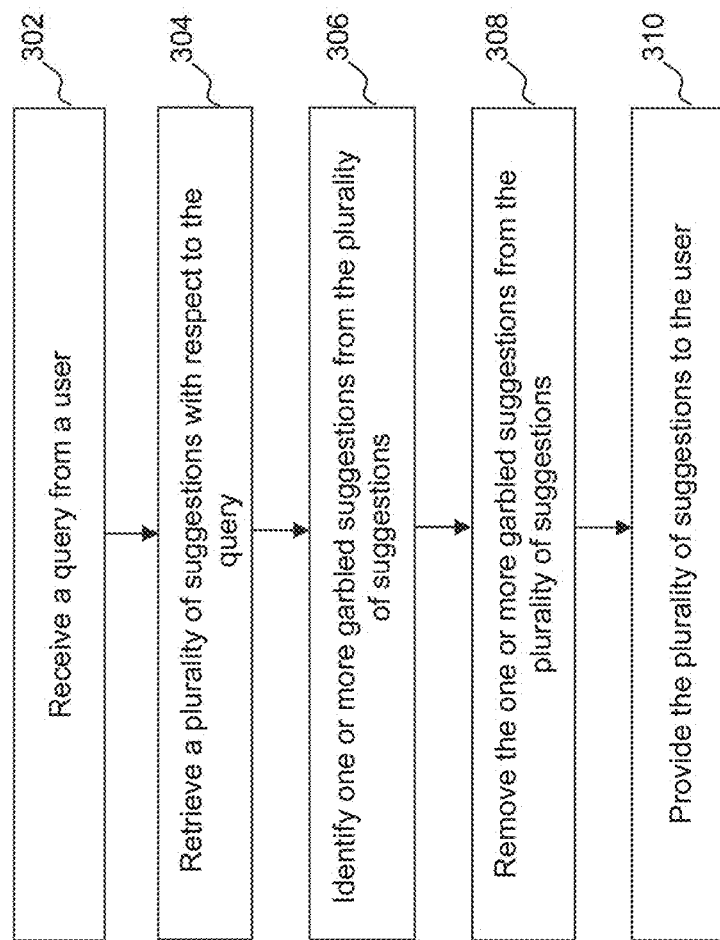
FIG. 3 illustrates an exemplary flowchart of providing query suggestions, according to an embodiment of the present teaching.

FIG. 3 illustrates an exemplary flowchart of providing query suggestions, according to an embodiment of the present teaching. A query is received from a user at 302. A plurality of suggestions with respect to the query are retrieved at 304. One or more garbled suggestions are identified from the plurality of suggestions at 306. The one or more garbled suggestions are removed from the plurality of suggestions at 308. The plurality of suggestions with removed garbled suggestions are provided to the user at 310. It should be appreciated that the processes in the flowchart are intended to be illustrative. In some embodiments, a process may be accomplished with one or more additional operations not described, and/or without one or more of the operations discussed. Further, the order in which the operations of the process as illustrated in FIG. 3 and set forth above is not intended to be limiting.

Figure 4:
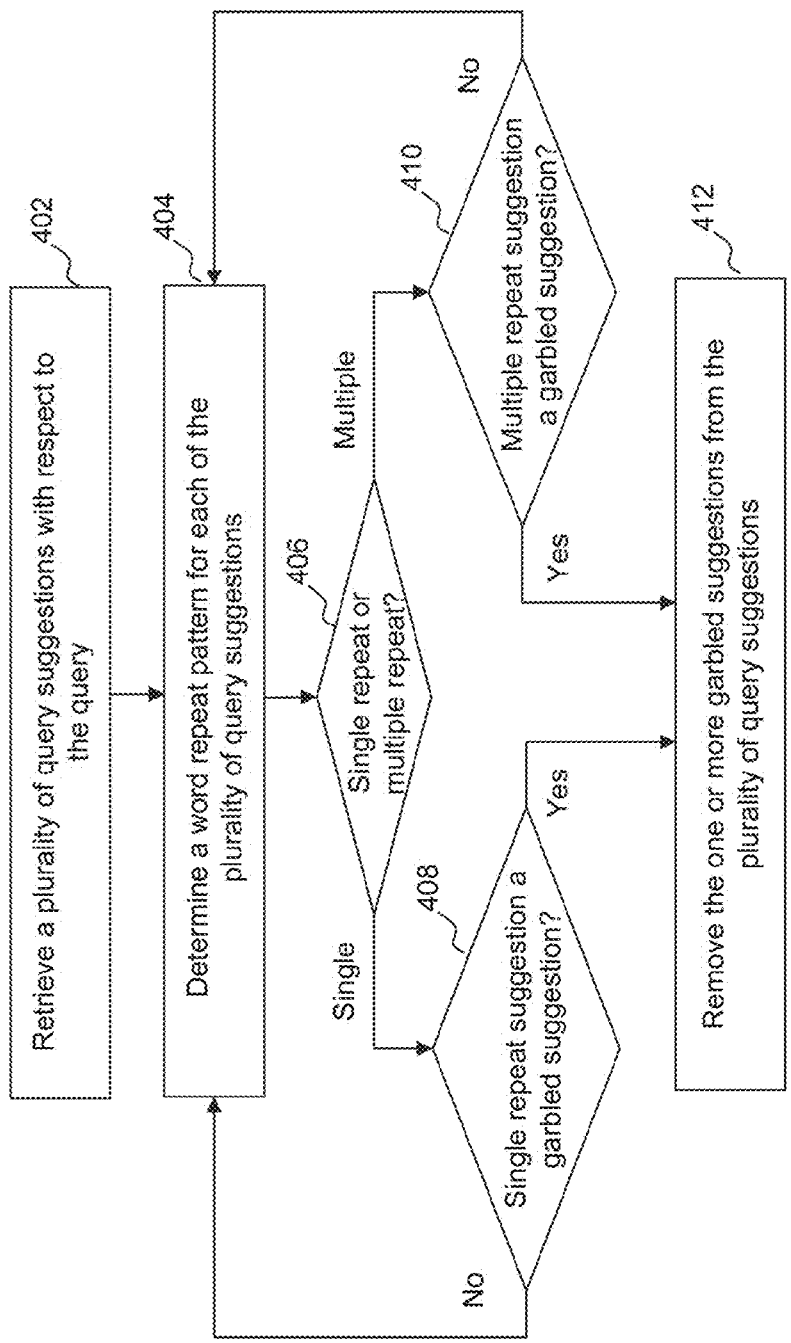
FIG. 4 illustrates an exemplary flowchart of identifying the garbled suggestions, according to an embodiment of the present teaching.

FIG. 4 illustrates an exemplary flowchart of identifying the garbled suggestions, according to an embodiment of the present teaching. A plurality of suggestions with respect to the query are retrieved at 402. A determination as to whether a word repeat pattern for each of the plurality of suggestions is made at 404. A determination as to whether it is a single repeat pattern or a multiple repeat pattern is made at 406. If it is a single repeat pattern, a determination as to whether the single repeat suggestion is a garbled suggestion is made at 408. If it is a multiple repeat pattern, a determination as to whether the multiple repeat suggestion is a garbled suggestion is made at 410. Further, one or more determined garbled suggestions are removed from the plurality of suggestions at 412. It should be appreciated that the processes in the flowchart are intended to be illustrative. In some embodiments, a process may be accomplished with one or more additional operations not described, and/or without one or more of the operations discussed. Further, the order in which the operations of the process as illustrated in FIG. 4 and set forth above is not intended to be limiting.

Figure 5:
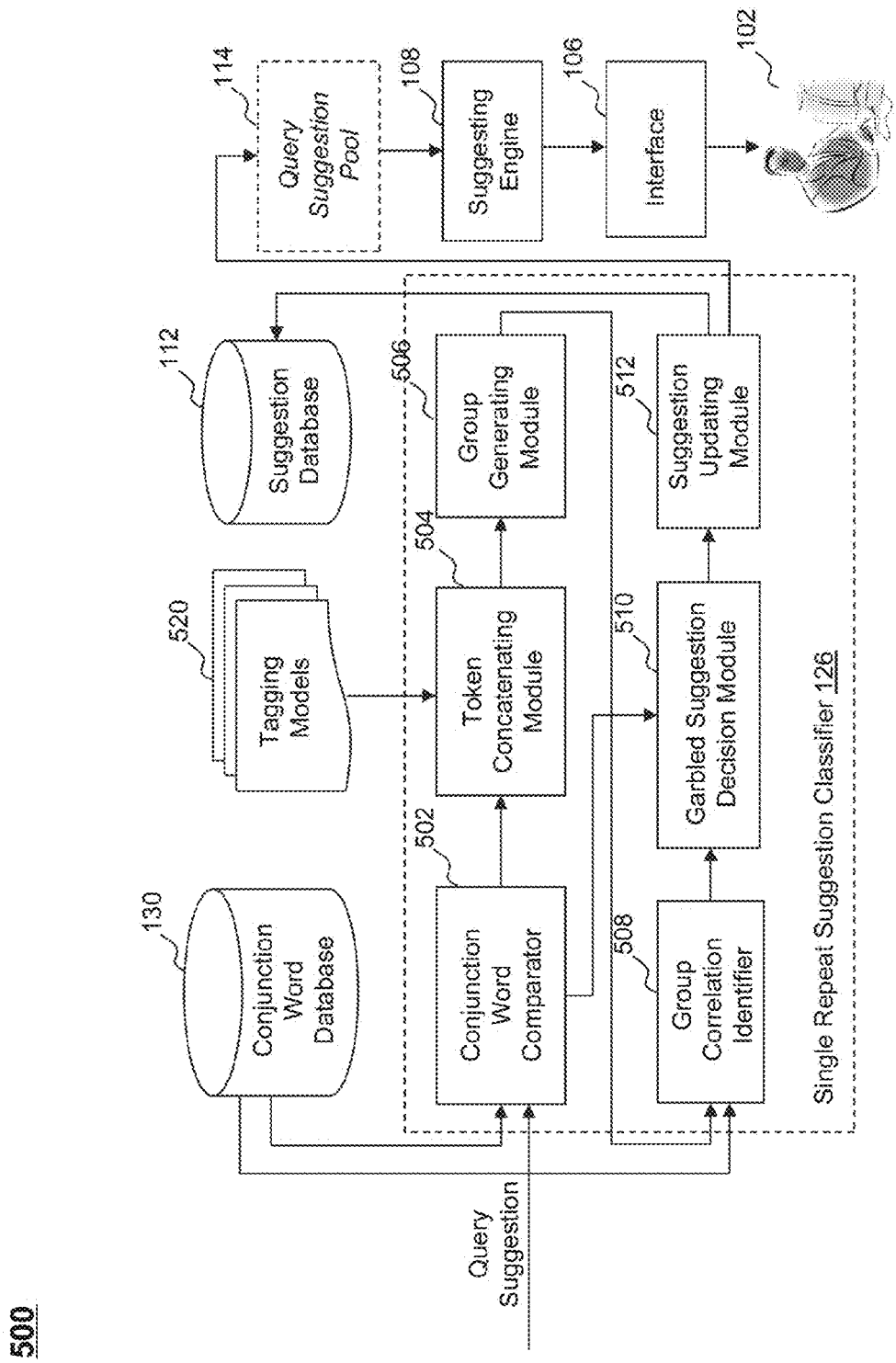
FIG. 5 illustrates an exemplary system diagram of a single repeated suggestion classifier, according to an embodiment of the present teaching.

FIG. 5 illustrates an exemplary system diagram of a single repeated suggestion classifier, according to an embodiment of the present teaching. Single repeat suggestion classifier 126 shown in FIG. 1 comprises a conjunction word comparator 502, a token concatenating module 504, a group generating module 506, a group correlation identifier 508, a garbled suggestion decision module 510, and a suggestion updating module 512. Conjunction word comparator 502 is configured to compare the received query suggestion having single repeated word with examples of conjunction words provided via conjunction word database 130. If a match of conjunction word is found between the received query suggestion with the examples of conjunction words, conjunction word comparator 502 forwards the comparison results to garbled suggestion decision module 510. A decision is made at garbled suggestion decision module 510 that the received query suggestion is not a garbled suggestion. If a match of conjunction word is not found between the received query suggestion with the examples of conjunction words, the received query suggestion is forwarded to token concatenating module 504 for further processing. FIG. 7 shows the examples of conjunction words. For example, conjunction word "to" makes phrases "fact to fact," "door to door," and "month to month." In another example, conjunction word "by" makes phrases "step by step," "side by side," and "day by day."

Token concatenating module 504 is configured to break the received query suggestion into individual tokens. The individual tokens may or may not be separated by one or more whitespaces or punctuations. Token concatenating module 504 may further apply a POS tag to each token. However, the present teaching is not intended to be limiting. Token concatenating module 504 may apply any types of tags that represent one or more aspects, properties, and/or characters for the purpose of language processing. In some other embodiments, token concatenating module 504 may select at least one tagging model from tagging models 520 to be applied to each token. Group generating module 506 is configured to generate one or more groups of words of suggestions based on the tags applied to the tokens, e.g., POS tags, each having an instance of the repeated token. Group correlation identifier 508 is configured to identify the correlation among the generated one or more groups of words of suggestions. In some embodiments, group correlation identifier 508 determines whether two groups of words of suggestions are connected via at least one conjunction word. Garbled suggestion decision module 510 is configured to determine whether a single repeat suggestion is a garbled suggestion based on the results from group correlation identifier 508. The decision is forwarded to suggestion updating module 512 to update suggestion database 112 and query suggestion pool 114.

It should be appreciated that the examples of conjunction word comparator 502, token concatenating module 504, group generating module 506, group correlation identifier 508, garbled suggestion decision module 510, and suggestion updating module 512 as illustrated in FIG. 5 are for illustrative purpose. The present teaching is not intended to be limiting. Single repeat suggestion classifier 126 may comprise more or less components than illustrated.

Figure 6:
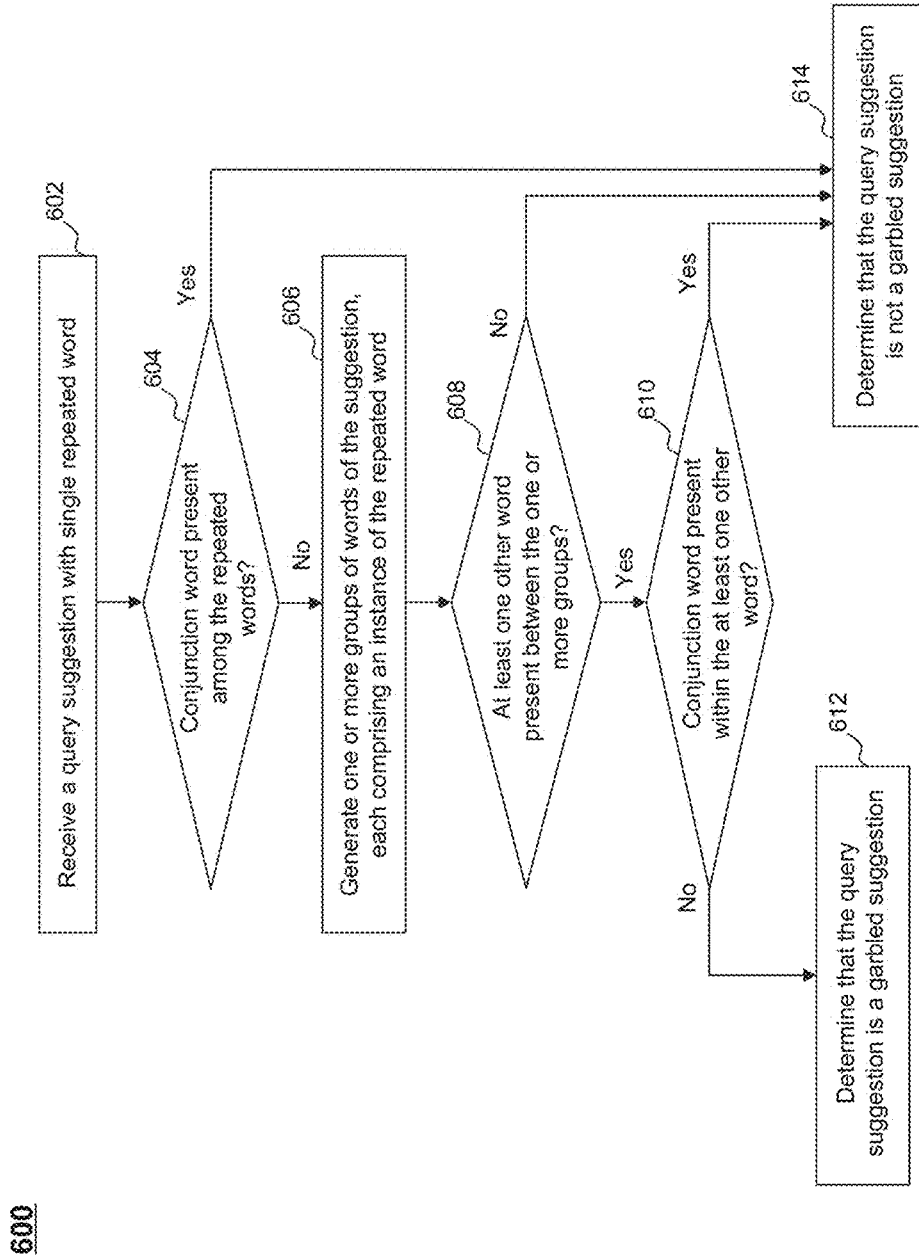
FIG. 6 illustrates an exemplary flowchart of the single repeated suggestion classifier, according to an embodiment of the present teaching.

FIG. 6 illustrates an exemplary flowchart of the single repeated suggestion classifier, according to an embodiment of the present teaching. A query suggestion with single repeated word is received at 602. A determination as to whether a conjunction word presents between the repeated words is made at 604. If a conjunction word presents between the repeated words, the query suggestion is determined to be non-garbled suggestion at 614. If a conjunction word does not present between the repeated words, one or more groups of words of the suggestion is generated at 606, where each group comprises an instance of the repeated word. Further, a decision as to whether at least one other word presents between the one or more groups is made at 608. If at least one other word does not present between the one or more groups, the query suggestion is determined to be non-garbled suggestion at 614. If at least one other word presents between the one or more groups, a further decision as to whether a conjunction word presents within the at least one other word is made at 610. If a conjunction word presents within the at least one other word, the query suggestion is determined to be non-garbled suggestion at 614. If a conjunction word does not present within the at least one other word, the query suggestion is determined to be a garbled suggestion at 612. It should be appreciated that the processes in the flowchart are intended to be illustrative. In some embodiments, a process may be accomplished with one or more additional operations not described, and/or without one or more of the operations discussed. Further, the order in which the operations of the process as illustrated in FIG. 6 and set forth above is not intended to be limiting.

Figure 9:
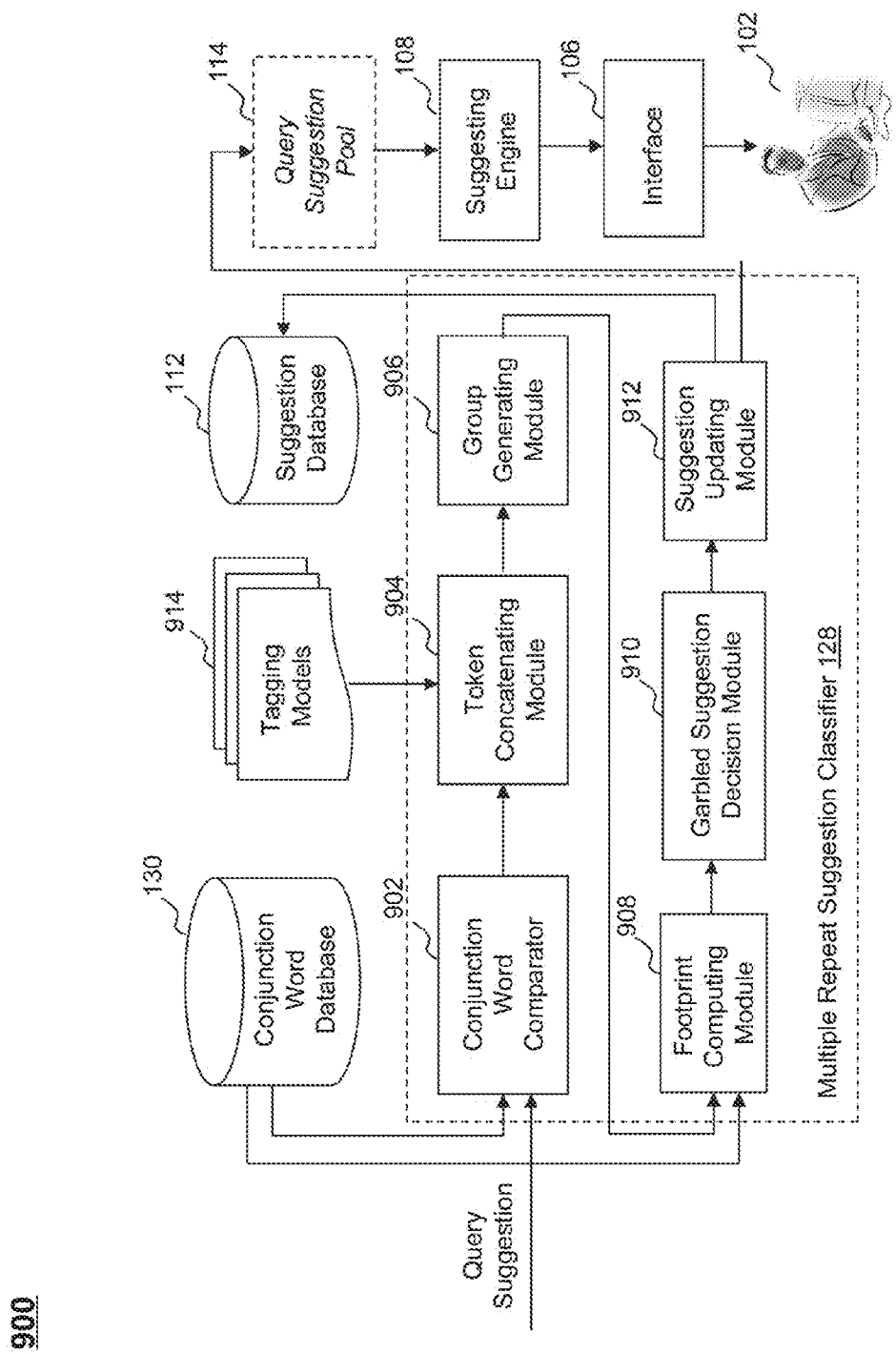
FIG. 9 illustrates an exemplary system diagram of a multiple repeated suggestion classifier, according to an embodiment of the present teaching.

FIG. 9 illustrates an exemplary system diagram of a multiple repeated suggestion classifier, according to an embodiment of the present teaching. Multiple repeat suggestion classifier 128 shown in FIG. 1 may comprise a conjunction word comparator 902, a token concatenating module 904, a group generating module 906, a footprint computing module 908, a garbled suggestion decision module 910, and a suggestion updating module 912. Conjunction word comparator 902 is configured to compare the received query suggestion having multiple repeated words with examples of conjunction words provided via conjunction word database 130. If a match of conjunction word is not found between the received query suggestion with the examples of conjunction words, the received query suggestion is forwarded to token concatenating module 904 for further processing. Token concatenating module 904 is configured to break the received query suggestion into individual tokens. The individual tokens may or may not be separated by one or more whitespaces or punctuations. Token concatenating module 904 may further apply a POS tag to each token. However, the present teaching is not intended to be limiting. Token concatenating module 904 may apply any types of tags that represent one or more aspects, properties, and/or characters for the purpose of language processing. In some other embodiments, token concatenating module 904 may select at least one tagging model from tagging models 920 to be applied to each token. Group generating module 906 is configured to generate one or more groups of words of suggestions based on the tags applied to the tokens, e.g., POS tags, each having an instance of the repeated tokens.

Footprint computing module 908 is configured to compute one or more footprints with respect to each group of tokens. A footprint with respect to a group of tokens refers to an alternative form of the group of tokens having at least one substitute synonym of the group of tokens. For example, for a group of tokens "T1 T2 T3," two synonyms "S11 S12" are found with respect to T1, one synonym "S31" is found with respect to T3, and one synonym "S21" is found with respect to "T2 T3." After synonym replacement, footprints of the group of tokens "T1 T2 T3" comprise "T1 S21," "S11 T2 T3," "S12 T2 T3," and "T1 T2 S31." In some embodiments, the words and/or synonyms in the footprint also are in alphabetic-numeric order to facilitate the determination as to whether two groups of tokens are identical. For example, for another group of tokens "T2 T3 T1," the corresponding footprints comprise "S21 T1," "T2 S31 T1," "T2 T3 S11," and "T2 T3 S12." After sorting each footprint for the groups of "T1 T2 T3," and "T2 T3 T1" in the alphabetic-numeric order, the two groups of tokens are determined to have identical footprints. The synonym of each token may be obtained from any type of synonym source, such as a synonym dictionary or a library.

In some embodiments, computing one or more footprints with respect to a group of tokens may comprise removing all white spaces and/or punctuations among the tokens; removing all stop words among the tokens; concatenating together all tokens; generating one or more concatenations of tokens with at least one substitution of the tokens with the synonym; and sorting the one or more concatenations of tokens in alphabetic-numeric order. It should be appreciated that the steps of computing the one or more footprints with respect to a group of tokens are intended to be illustrative. In some embodiments, the computing may be accomplished with one or more additional steps not described, and/or without one or more of the steps discussed. Further, the order of the steps of computing set forth above is not intended to be limiting.

Garbled suggestion decision module 910 is configured to determine whether a multiple repeat suggestion is a garbled suggestion based on the results from footprint computing module 908. If at least one identical footprint is found between two groups of tokens, garbled suggestion decision module 910 determines that the query suggestion is a garbled suggestion. If no identical footprint is found between two groups of tokens, garbled suggestion decision module 910 determines that the query suggestion is not a garbled suggestion. The decision is forwarded to suggestion updating module 912 to update suggestion database 112 and query suggestion pool 114. Referring to FIG. 8, two query suggestions are analyzed individually. In the example of "air force wallpaper air force," two identical groups "air force" are generated, and therefore, the query suggestion is determined to be a garbled suggestion. In another example of "best love poems love poems quotes," two groups are generated as "best love poems" and "love poems quotes." As two groups are not identical, the query suggestion is determined to be not a garbled suggestion.

It should be appreciated that the examples of conjunction word comparator 902, token concatenating module 904, group generating module 906, footprint computing module 908, garbled suggestion decision module 910, and suggestion updating module 912 as illustrated in FIG. 9 are for illustrative purpose. The present teaching is not intended to be limiting. Multiple repeat suggestion classifier 128 may comprise more or less components than illustrated.

Figure 10:
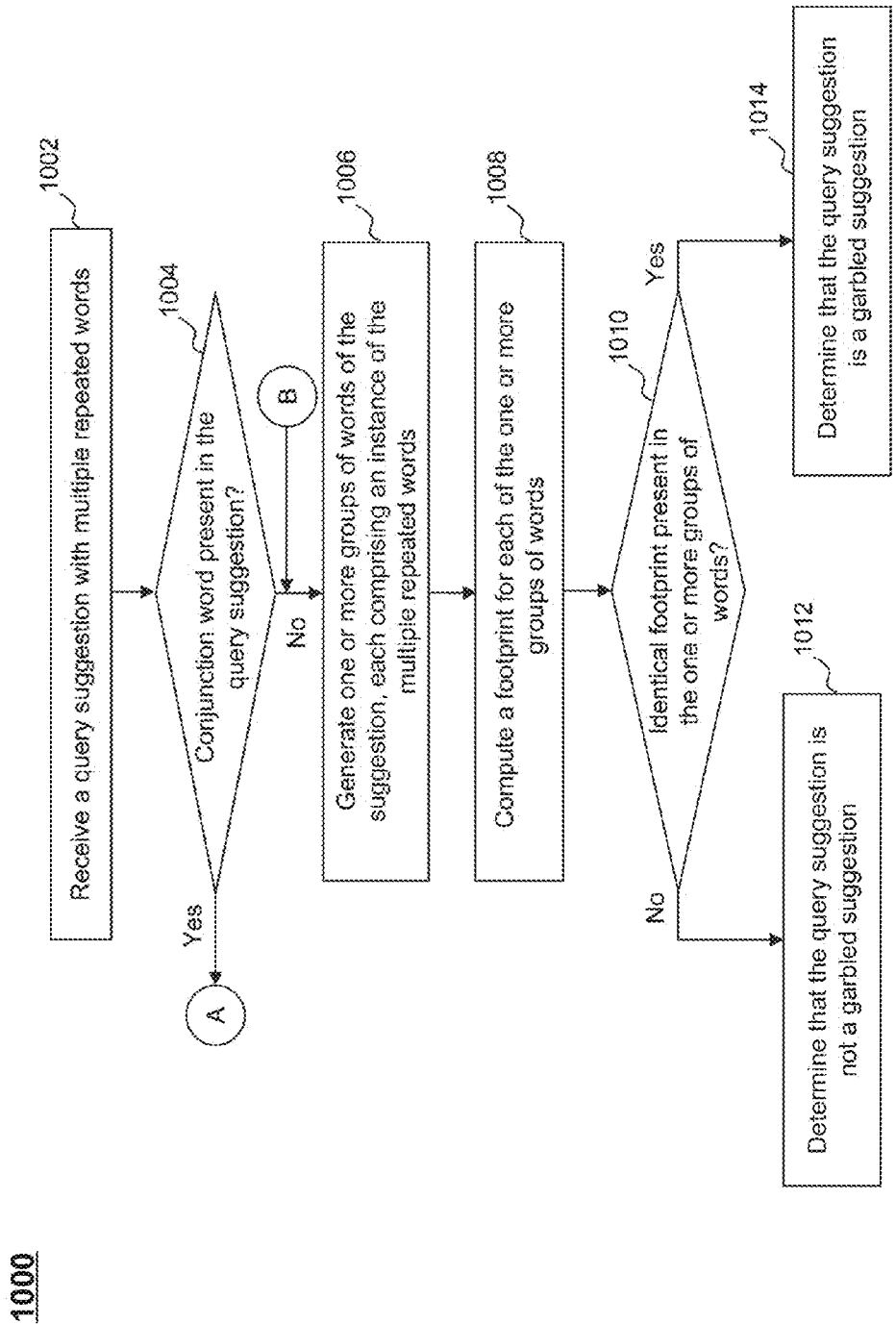
FIG. 10 illustrates an exemplary flowchart of the multiple repeated suggestion classifier, according to an embodiment of the present teaching.

FIG. 10 illustrates an exemplary flowchart of the multiple repeated suggestion classifier, according to an embodiment of the present teaching. A query suggestion with multiple repeated words is received at 1002. A decision as to whether a conjunction word presents in the query suggestion is made at 1004. One or more groups of words of the suggestions are generated at 1006, where each of the one or more groups of words comprises an instance of the multiple repeated words. One or more footprints for each of the one or more groups of words are computed at 1008. A decision as to whether identical footprints present in the one or more groups of words is made at 1010. If at least one identical footprint is found between two groups of tokens, a decision that the query suggestion is a garbled suggestion is made at 1014. If no identical footprint is found between two groups of tokens, a decision that the query suggestion is not a garbled suggestion is made at 1012. It should be appreciated that the processes in the flowchart are intended to be illustrative. In some embodiments, a process may be accomplished with one or more additional operations not described, and/or without one or more of the operations discussed. Further, the order in which the operations of the process as illustrated in FIG. 10 and set forth above is not intended to be limiting.

Figure 11:
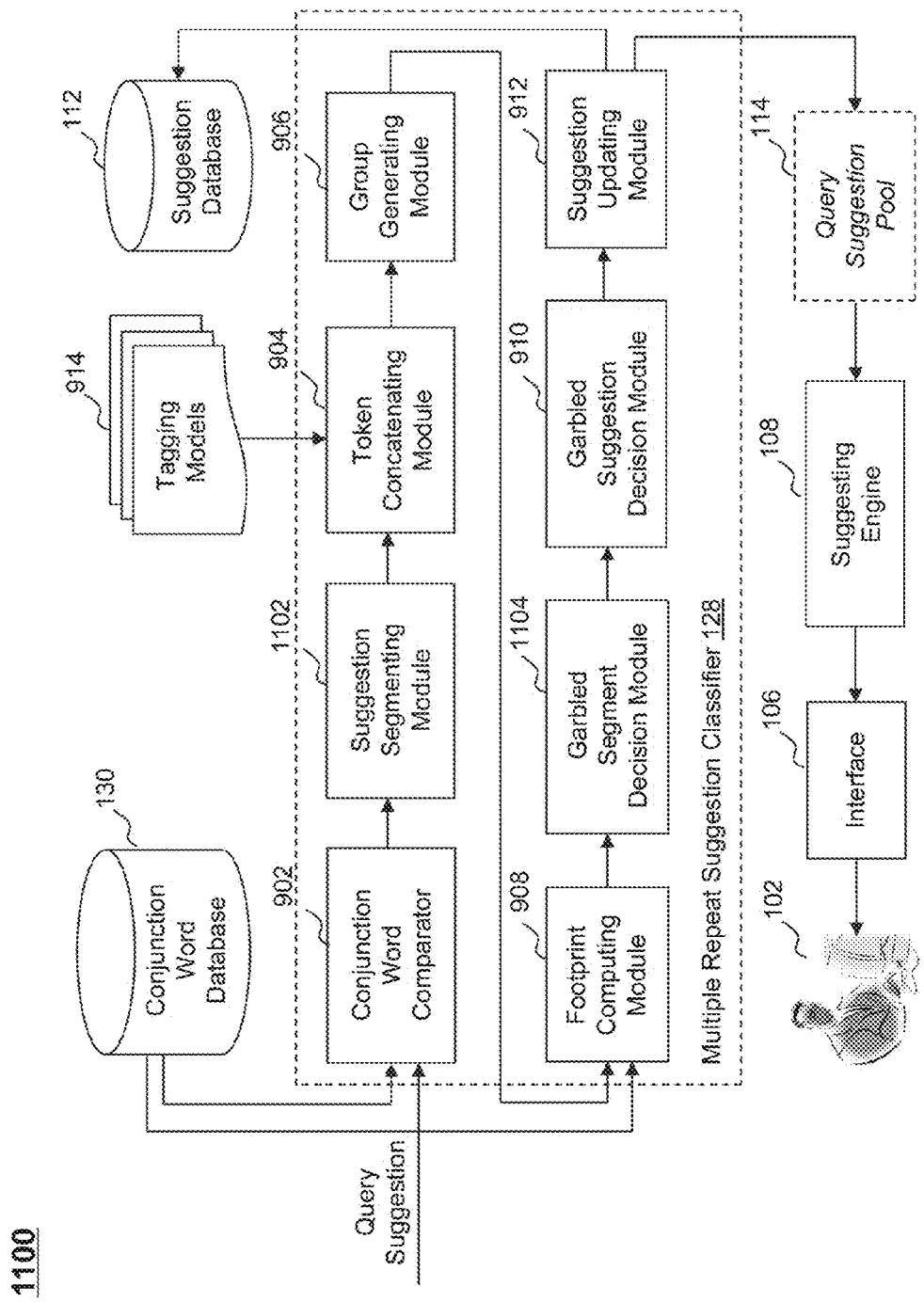
FIG. 11 illustrates an exemplary system diagram of a multiple repeated suggestion classifier, according to another embodiment of the present teaching.

FIG. 11 illustrates an exemplary system diagram of a multiple repeated suggestion classifier, according to another embodiment of the present teaching. Similar to the embodiment illustrated in FIG. 9, multiple repeat suggestion classifier 128 shown in FIG. 1 comprises a conjunction word comparator 902, a token concatenating module 904, a group generating module 906, a footprint computing module 908, a garbled suggestion decision module 910, and a suggestion updating module 912. According to the embodiment illustrated in FIG. 11, multiple repeat suggestion classifier 128 may further comprise a suggestion segmenting module 1102 and a garbled segment decision module 1104. Conjunction word comparator 902 compares the received query suggestion with examples of conjunction words provided via conjunction word database 130. If a match of conjunction word is found between the received query suggestion with the examples of conjunction words, the received query suggestion is forwarded to suggestion segmenting module 1102 for further processing. Suggestion segmenting module 1102 is configured to divide the multiple repeat suggestion into one or more segments separated by the one or more conjunction words. The operations of token concatenating module 904 are described above and are not detailed herein. As the multiple repeat suggestion is divided into one or more segments, group generating module 906 is configured to generate one or more groups of words for each segment based on the tags applied to the tokens, each having an instance of the repeated tokens. Footprint computing module 908 is configured to compute one or more footprints with respect to each group of tokens for each segment.

Garbled segment decision module 1104 is configured to determine whether a segment of the multiple repeat suggestion is a garbled segment based on the results from footprint computing module 908. If at least one identical footprint is found between two groups of tokens within a segment, garbled segment decision module 1104 determines that the segment of the multiple repeat suggestion is a garbled segment. Garbled suggestion decision module 910 further determines that the multiple repeat suggestion is a garbled suggestion. If no identical footprint is found between two groups of tokens within a segment, garbled segment decision module 1104 determines that the segment of the multiple repeat suggestion is not a garbled segment. Garbled segment decision module 1104 repeats the decisions until all segments within the multiple repeat suggestion are checked. If for all segments, no identical footprint is found between two groups of tokens within a segment, garbled suggestion decision module 910 determines that the multiple repeat suggestion is not a garbled suggestion. The decision is forwarded to suggestion updating module 912 to update suggestion database 112 and query suggestion pool 114.

It should be appreciated that the examples of conjunction word comparator 902, token concatenating module 904, group generating module 906, footprint computing module 908, garbled suggestion decision module 910, suggestion updating module 912, suggestion segmenting module 1102, and garbled segment decision module 1104 as illustrated in FIG. 11 are for illustrative purpose. The present teaching is not intended to be limiting. Multiple repeat suggestion classifier 128 may comprise more or less components than illustrated.

Figure 12:
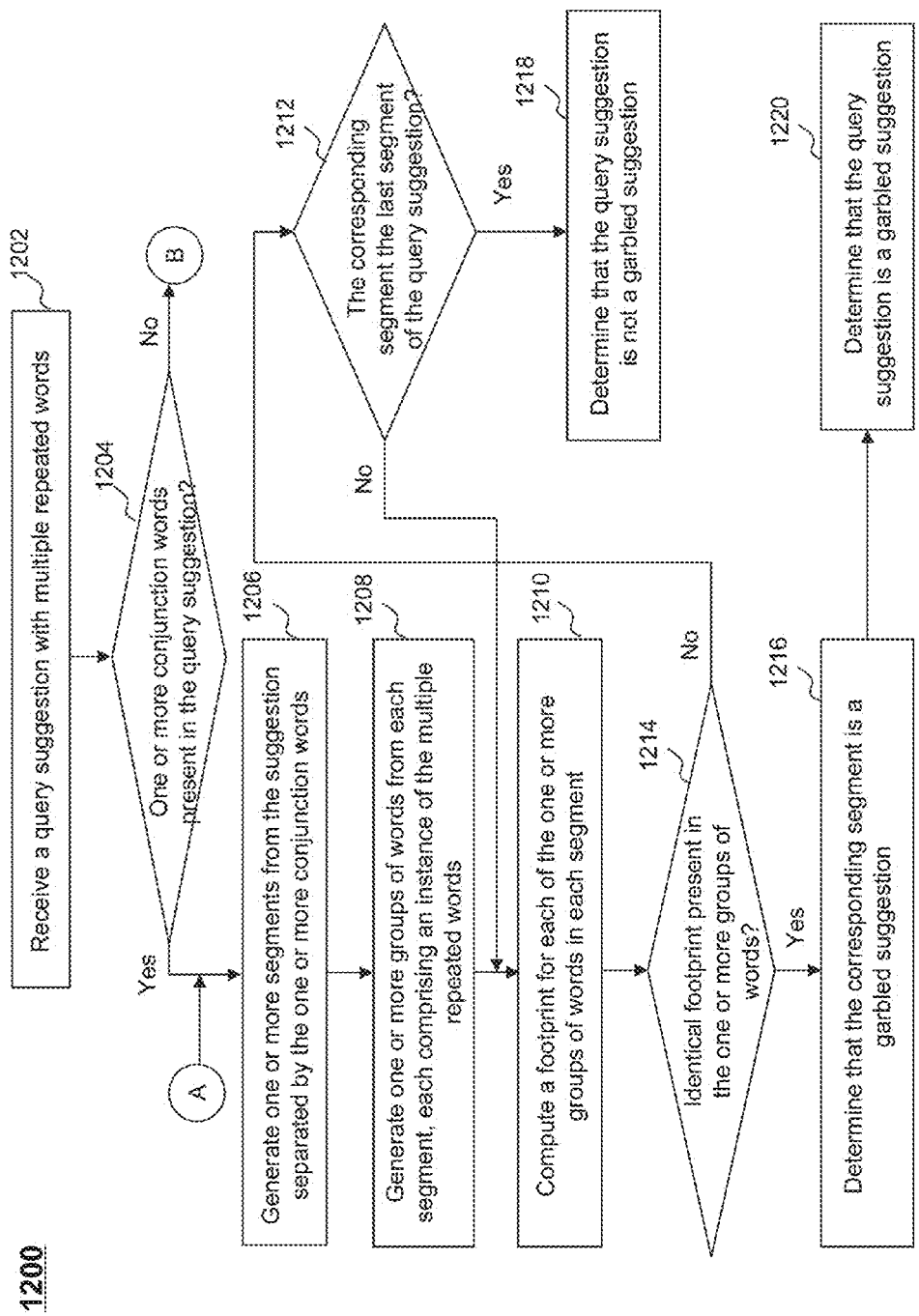
FIG. 12 illustrates an exemplary flowchart of the multiple repeated suggestion classifier, according to another embodiment of the present teaching.

FIG. 12 illustrates an exemplary flowchart of the multiple repeated suggestion classifier, according to another embodiment of the present teaching. A query suggestion with multiple repeated words are received at 1202. A decision as to whether one or more conjunction words present in the query suggestion is made at 1204. If one or more conjunction words present in the query suggestion, one or more segments separated by the one or more conjunction words are generated from the query suggestion at 1206. One or more groups of words are generated with respect to each segment at 1208, where each segment comprises an instance of the multiple repeated words. One or more footprints for each of the one or more groups of words are computed for each segment at 1210. A decision as to whether identical footprints present in the one or more groups of words is made at 1214. If identical footprints present in the one or more groups of words, the corresponding segment is determined to be a garbled segment at 1216. Further, the query suggestion with multiple repeated words is determined to be a garbled suggestion at 1220. If identical footprints present in the one or more groups of words, a further decision as to whether the corresponding segment is the last segment of the query suggestion is made at 1212. If the corresponding segment is not the last segment of the query suggestion, the operations of 1210, 1214 and 1216 repeat until the segment becomes the last segment of the query suggestion. If the corresponding segment is the last segment of the query suggestion, as all segments within the query suggestion are not garbled segments, the query suggestion with multiple repeated words is determined to be not a garbled suggestion at 1218. It should be appreciated that the processes in the flowchart are intended to be illustrative. In some embodiments, a process may be accomplished with one or more additional operations not described, and/or without one or more of the operations discussed. Further, the order in which the operations of the process as illustrated in FIG. 12 and set forth above is not intended to be limiting.

Figure 13:
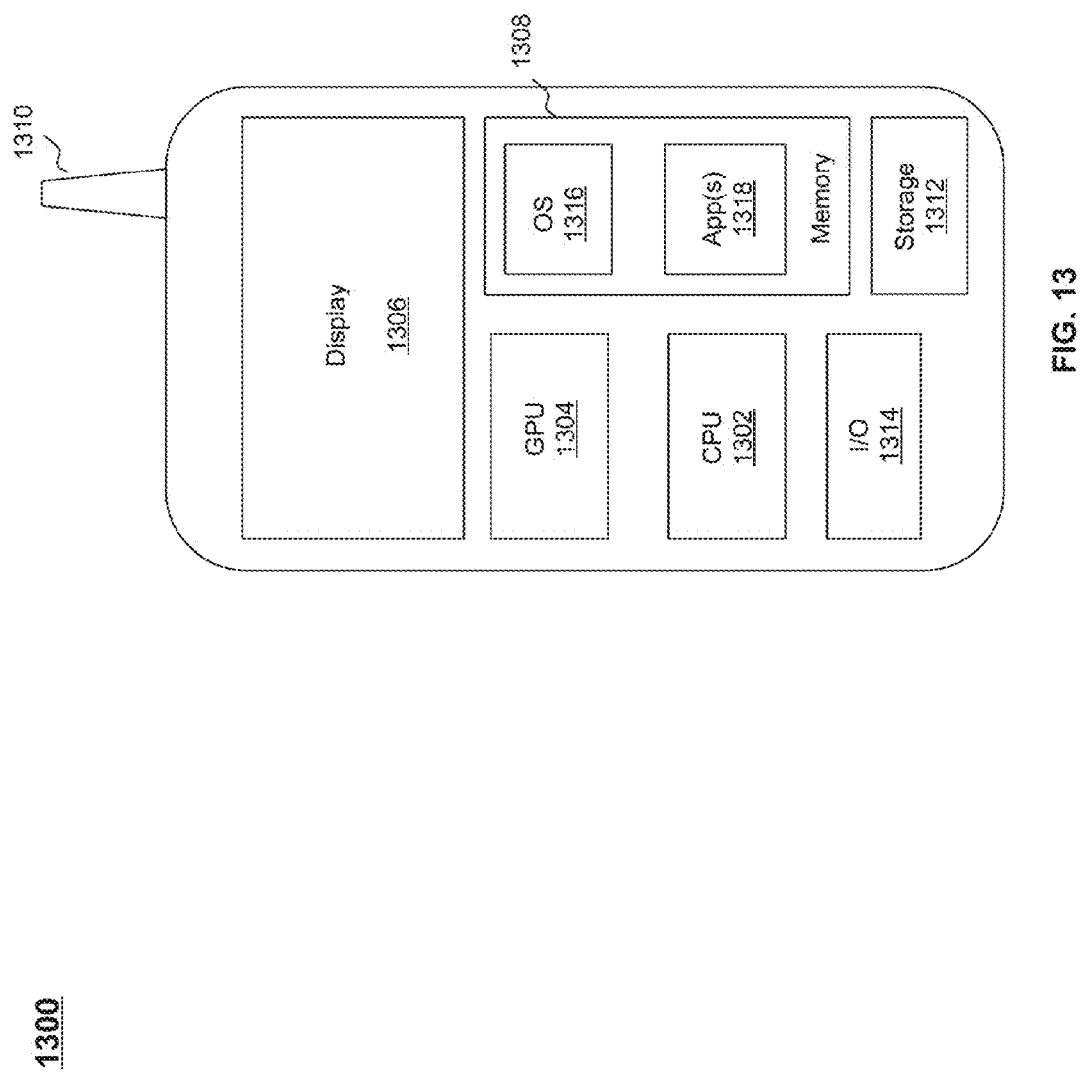
FIG. 13 illustrates a general mobile device architecture on which the present teaching can be implemented.

FIG. 13 depicts a general mobile device architecture on which the present teaching can be implemented. In this example, the user device is a mobile device 1300, including but is not limited to, a smart phone, a tablet, a music player, a handled gaming console, a global positioning system (GPS) receiver, a smart-TV, wearable devices, etc. The mobile device 1600 in this example includes one or more central processing units (CPUs) 1302, one or more graphic processing units (GPUs) 1304, a display 1306, a memory 1308, a communication platform 1310, such as a wireless communication module, storage 1312, and one or more input/output (I/O) devices 1314. Any other suitable component, such as but not limited to a system bus or a controller (not shown), may also be included in the mobile device 1300. As shown in FIG. 13, a mobile operating system 1316, e.g., iOS, Android, Windows Phone, etc., and one or more applications 1318 may be loaded into the memory 1308 from the storage 1312 in order to be executed by the CPU 1302. The applications 1318 may include a browser or any other suitable mobile apps for sending the search query and rendering the search results page through the mobile device 1300. Execution of the applications 1318 may cause the mobile device 1300 to perform the processing as described above in the present teaching. For example, presentation of a search results page to the user may be made by the GPU 1304 in conjunction with the display 1306. A search query may be inputted by the user via the I/O devices 1314 and transmitted to a search engine via a communication platform 1310.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 14:
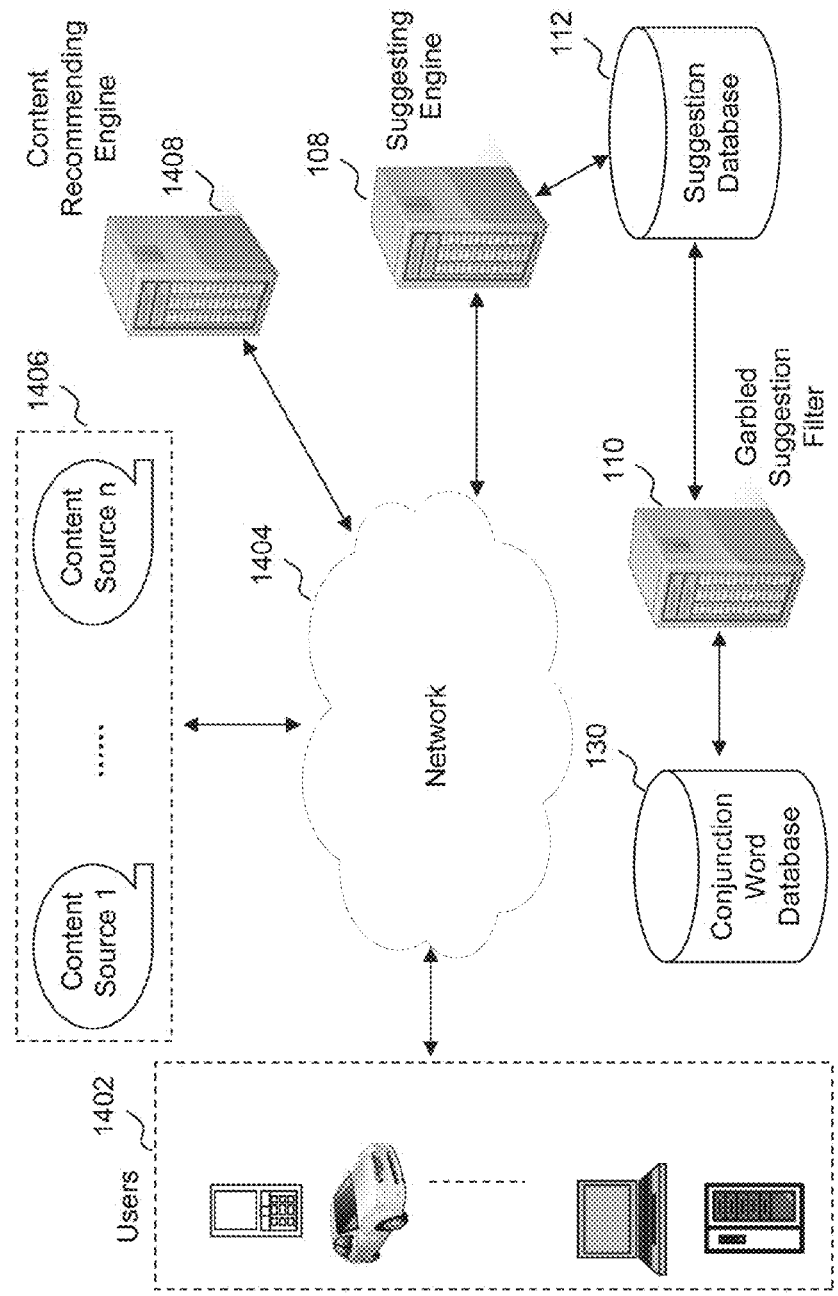
FIG. 14 illustrates a network environment of providing query suggestions, according to an embodiment of the present teaching.

FIG. 14 illustrates a network environment of providing query suggestions, according to an embodiment of the present teaching. The exemplary networked environment 1400 includes users 1402, a suggesting engine 108, a garbled suggestion filter 110, a suggestion database 112, a conjunction word database 130, and a network 1404. User 1402 may connect to network 1404 via different types of terminal devices including but not limited to desktop computers, laptop computers, a built-in device in a motor vehicle, or a mobile device. A query typed by user 1402 is forwarded via network 1404 to suggesting engine 108. Suggesting engine 108 generates one or more query suggestions from suggestion database 112 to be presented on the terminal device to user 1402. In some embodiments, suggesting engine 108 forwards the one or more query suggestions to garbled suggestion filter 110 to ensure that the query suggestions provide meaningful information to user 1402. Garbled suggestion filter 110, suggestion database 112, and conjunction word database 130 may operate as a backend of suggesting engine 108. Network 1404 may be a single network or a combination of different networks. For example, the network 1402 may be a local area network (LAN), a wide area network (WAN), a public network, a private network, a proprietary network, a Public Telephone Switched Network (PSTN), the Internet, a wireless network, a virtual network, or any combination thereof. Network 1404 may also include various network access points, e.g., wired or wireless access points such as base stations or Internet exchange points, through which a data source may connect to the network 1404 in order to transmit information via the network 1404.

In some embodiments, the exemplary networked environment 1400 may further include one or more content source 1406 and a content recommending engine 1408. Content resource 1406 may correspond to a website hosted by an entity, whether an individual, a business, or an organization such as USPTO.gov, a content provider such as cnn.com and Yahoo.com, a social network website such as Facebook.com, or a content feed source such as tweeter or blogs. Upon the user selects one of the query suggestions, content recommending engine 1408 may retrieve information from any of the content resources and recommend it to the user.

Figure 15:
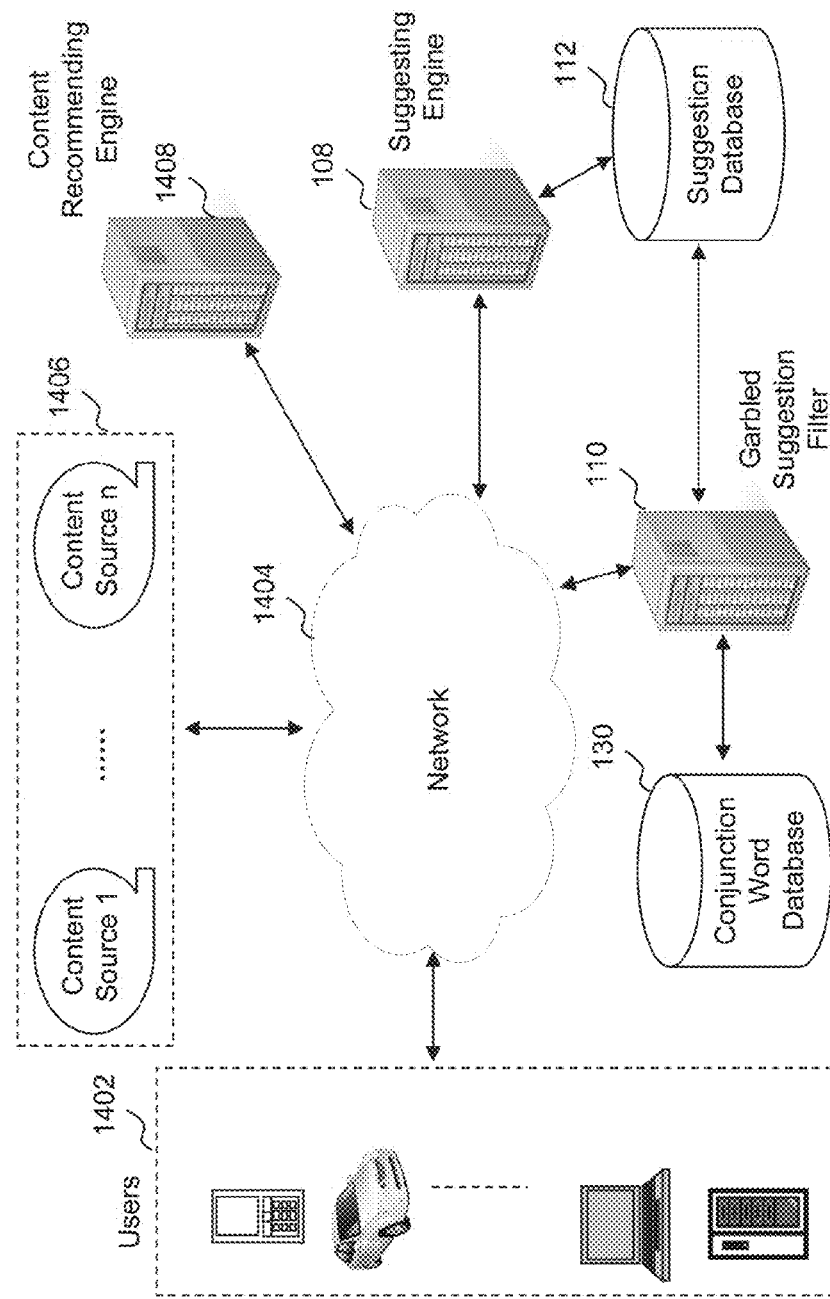
FIG. 15 illustrates a network environment of providing query suggestions, according to another embodiment of the present teaching.

FIG. 15 illustrates a network environment of providing query suggestions, according to another embodiment of the present teaching. The networked environment 1500 in this embodiment is similar to the networked environment 1400 in FIG. 14, except that garbled suggestion filter 110 acts as an independent service providers that directly connect to network 1404.

Figure 16:
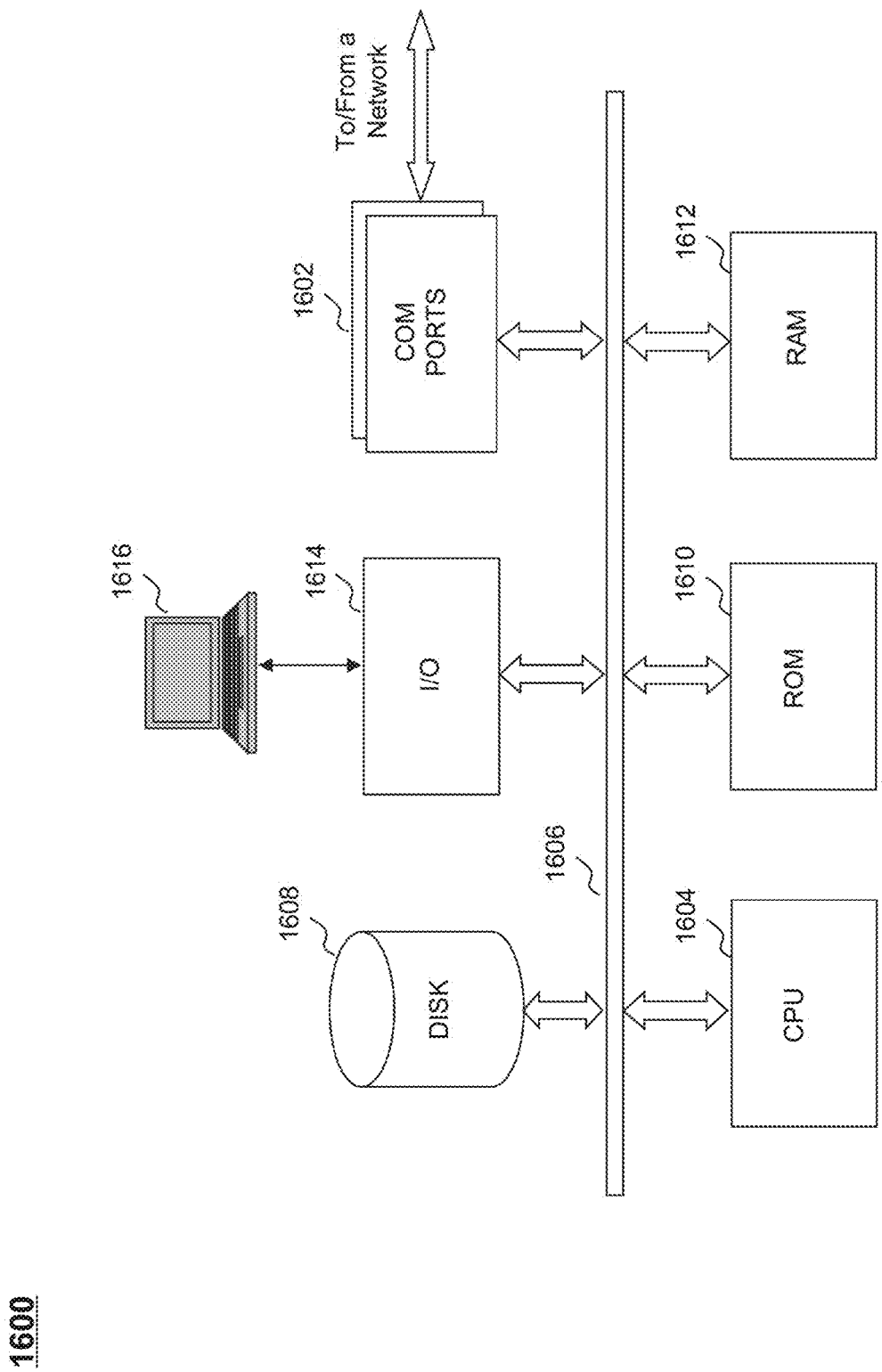
FIG. 16 depicts a general computer architecture on which the present teaching can be implemented.

FIG. 16 depicts a general computer architecture on which the present teaching can be implemented. The computer may be a general-purpose computer or a special purpose computer. This computer can be used to implement any components of the system for providing query suggestions as described herein. Different components of the systems disclosed in the present teaching can all be implemented on one or more computers such as computer, via its hardware, software program, firmware, or a combination thereof. Although only one such computer is shown, for convenience, the computer functions relating to content recommendation may be implemented in a distributed fashion on a number of similar platforms, to distribute the processing load.

The computer, for example, includes COM ports 1602 connected to and from a network connected thereto to facilitate data communications. The computer also includes a CPU 1604, in the form of one or more processors, for executing program instructions. The exemplary computer platform includes an internal communication bus 1606, program storage and data storage of different forms, e.g., disk 1608, read only memory (ROM) 1610, or random access memory (RAM) 1612, for various data files to be processed and/or communicated by the computer, as well as possibly program instructions to be executed by the CPU 1604. The computer also includes an I/O component 1614, supporting input/output flows between the computer and other components therein such as user interface elements 1616. The computer may also receive programming and data via network communications.

Hence, aspects of the methods of user profiling for recommending content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computing device having at least one processor, storage, and a communication platform connected to a network for providing query suggestions, the method comprising:
    receiving a query from a user;
    obtaining a plurality of suggestions with respect to the query;
    identifying one or more of the plurality of suggestions that are garbled, wherein each of the one or more of the plurality of suggestions comprises at least one repeated word, the identifying being based on a model trained to recognize a linguistic connection between the at least one repeated word;
    removing the one or more of the plurality of suggestions; and
    providing the plurality of suggestions without the one or more of the plurality of suggestions to the user in response to the query.

2. The method of claim 1, wherein the at least one repeated word comprises one repeated word, identifying the one or more of the plurality of suggestions further comprises:
  determining whether a suggestion of the plurality of suggestions comprises one repeated word; and
  when it is determined that the suggestion comprises one repeated word,
    generating a plurality of groups of words of the suggestion, each comprising an instance of the one repeated word;
    determining a correlation among the plurality of groups of words; and
    determining whether the suggestion is a garbled suggestion based on the correlation, wherein the garbled suggestion comprises a suggestion that causes confusion.

3. The method of claim 2, wherein generating the plurality of groups of words of the suggestion further comprises:
  assigning a part of speech (POS) tag to each word of the suggestion; and
  integrating one or more words to form a group based on the assigned POS tags.

4. The method of claim 2, wherein the correlation indicates whether two groups of words are connected via at least a conjunction word.

5. The method of claim 1, wherein the at least one repeated word comprises at least two repeated words, identifying the one or more of the plurality of suggestions further comprises:
  determining whether a suggestion of the plurality of suggestions comprises at least two repeated word; and
  when it is determined that the suggestion comprises at least two repeated words,
    determining whether the suggestion comprises at least one conjunction word; and
    if the suggestion comprises no conjunction word,
      generating a first set of groups of words of the suggestion, each comprising an instance of the at least two repeated words;
      transforming the first set of groups of words to a second set of groups of words;
      determining whether there are two identical groups of words from the second set of groups of words;
      if there are two identical groups of words from the second set of groups of words,
        determining that the suggestion is a garbled suggestion, the garbled suggestion comprising a suggestion that causes confusion; and
      if there are no two identical groups of words from the second set of groups of words,
        determining that the suggestion is not the garbled suggestion.

6. The method of claim 5, further comprising:
  if the suggestion comprises at least one conjunction word,
    generating one or more segments of the suggestion separated by the at least one conjunction word;
    determining whether at least one of the one or more segments is a garbled segment; and
    when it is determined that at least one of the one or more segments is a garbled segment, determining that the suggestion is the garbled suggestion.

7. The method of claim 6, wherein determining whether the at least one of the one or more segments is the garbled segment further comprises:
  generating a first set of groups of words of the suggestion for each of the one or more segments, each comprising an instance of the at least two repeated words;
  transforming the first set of groups of words to a second set of groups of words;
  determining whether there are two identical groups of words from the second set of groups of words;
  if there are two identical groups of words from the second set of groups of words,
    determining that the segment is the garbled suggestion; and
  if there are no two identical groups of words from the second set of groups of words,
    determining that the segment is not the garbled suggestion.

8. A system having at least one processor, storage, and a communication platform for providing query suggestions, the system comprising:
  an interface implemented on the at least one processor and configured to receive a query from a user;
  a suggesting engine implemented on the at least one processor and configured to obtain a plurality of suggestions with respect to the query; and
  a garbled suggestion filter implemented on the at least one processor and configured to
    identify one or more of the plurality of suggestions that are garbled, wherein each of the one or more of the plurality of suggestions comprises at least one repeated word, the identifying being based on a model trained to recognize a linguistic connection between the at least one repeated word; and
    remove the one or more of the plurality of suggestions,
    wherein the suggesting engine is further configured to provide the plurality of suggestions without the one or more of the plurality of suggestions to the user in response to the query.

9. The system of claim 8, wherein the at least one repeated word comprises one repeated word, the garbled suggestion filter is further configured to:
  determine whether a suggestion of the plurality of suggestions comprises one repeated word; and
  when it is determined that the suggestion comprises one repeated word,
    generate a plurality of groups of words of the suggestion, each comprising an instance of the repeated word;
    determine a correlation among the plurality of groups of words; and
    determine whether the suggestion is a garbled suggestion based on the correlation, wherein the garbled suggestion comprises a suggestion that causes confusion.

10. The system of claim 9, wherein the garbled suggestion filter is further configured to:
  assign a part of speech (POS) tag to each word of the suggestion; and
  integrate one or more words to form a group based on the assigned POS tags.

11. The system of claim 9, wherein the correlation indicates whether two groups of words are connected via at least a conjunction word.

12. The system of claim 8, wherein the at least one repeated word comprises at least two repeated words, the garbled suggestion filter is further configured to:
  determine whether a suggestion of the plurality of suggestions comprises at least two repeated word; and when it is determined that the suggestion comprises at least two repeated words, determine whether the suggestion comprises at least one conjunction word; and
if the suggestion comprises no conjunction word,
generate a first set of groups of words of the suggestion, each comprising an instance of the at least two repeated words;
transform the first set of groups of words to a second set of groups of words;
determine whether there are two identical groups of words from the second set of groups of words;
if there are two identical groups of words from the second set of groups of words,
determine that the suggestion is a garbled suggestion, wherein the garbled suggestion comprises a suggestion that causes confusion; and
if there are no two identical groups of words from the second set of groups of words,
determine that the suggestion is not the garbled suggestion.

13. The system of claim 12, wherein the garbled suggestion filter is further configured to:
if the suggestion comprises at least one conjunction word,
generate one or more segments of the suggestion separated by the at least one conjunction word;
determine whether at least one of the one or more segments is a garbled segment; and
when it is determined that at least one of the one or more segments is a garbled segment, determine that the suggestion is the garbled suggestion.

14. The system of claim 13, wherein the garbled suggestion filter being configured to determine whether the at least one of the one or more segments is the garbled segment comprises the garbled suggestion filter being further configured to:
generate a first set of groups of words of the suggestion for each of the one or more segments, each comprising an instance of the at least two repeated words;
transform the first set of groups of words to a second set of groups of words;
determine whether there are two identical groups of words from the second set of groups of words;
if there are two identical groups of words from the second set of groups of words,
determine that the segment is the garbled suggestion; and
if there are no two identical groups of words from the second set of groups of words,
determine that the segment is not the garbled suggestion.

15. A non-transitory machine-readable storage medium having information recorded thereon for providing query suggestions, wherein the information, when read by the machine, causes the machine to perform the following:
receiving a query from a user;
obtaining a plurality of suggestions with respect to the query;
identifying one or more of the plurality of suggestions that are garbled, wherein each of the one or more of the plurality of suggestions comprises at least one repeated word, the identifying being based on a model trained to recognize a linguistic connection between the at least one repeated word;
removing the one or more of the plurality of suggestions; and
providing the plurality of suggestions without the one or more of the plurality of suggestions to the user in response to the query.

16. The medium of claim 15, wherein the information associated with identifying the one or more of the plurality of suggestions, when read by the machine, causes the machine to further perform the following:
determining whether a suggestion of the plurality of suggestions comprises one repeated word, wherein the at least one repeated word comprises one repeated word; and
when it is determined that the suggestion comprises one repeated word,
generating a plurality of groups of words of the suggestion, each comprising an instance of the repeated word;
determining a correlation among the plurality of groups of words; and
determining whether the suggestion is a garbled suggestion based on the correlation, wherein the garbled suggestion comprises a suggestion that causes confusion.

17. The medium of claim 16, wherein the information associated with generating the plurality of groups of words of the suggestion, when read by the machine, causes the machine to further perform the following:
assigning a part of speech (POS) tag to each word of the suggestion; and
integrating one or more words to form a group based on the assigned POS tags.

18. The medium of claim 16, wherein the correlation indicates whether two groups of words are connected via at least a conjunction word.

19. The medium of claim 15, wherein the information associated with identifying the one or more of the plurality of suggestions, when read by the machine, causes the machine to further perform the following:
determining whether a suggestion of the plurality of suggestions comprises at least two repeated word, wherein the at least one repeated word comprises at least two repeated word; and
when it is determined that the suggestion comprises at least two repeated words, determining whether the suggestion comprises at least one conjunction word;
if the suggestion comprises no conjunction word,
generating a first set of groups of words of the suggestion, each comprising an instance of the at least two repeated words;
transforming the first set of groups of words to a second set of groups of words;
determining whether there are two identical groups of words from the second set of groups of words;
if there are two identical groups of words from the second set of groups of words,
determining that the suggestion is a garbled suggestion, wherein the garbled suggestion comprises a suggestion that causes confusion; and
if there are no two identical groups of words from the second set of groups of words,
determining that the suggestion is not the garbled suggestion; and
if the suggestion comprises at least one conjunction word,
generating one or more segments of the suggestion separated by the at least one conjunction word;
determining whether at least one of the one or more segments is a garbled segment; and when it is determined that at least one of the one or more segments is the garbled segment,
determining that the suggestion is the garbled suggestion.

20. The medium of claim 19, wherein the information associated with determining whether the at least one of the one or more segments is the garbled segment, when read by the machine, causes the machine to further perform the following:
generating a first set of groups of words of the suggestion for each of the one or more segments, each comprising an instance of the at least two repeated words;
transforming the first set of groups of words to a second set of groups of words;
determining whether there are two identical groups of words from the second set of groups of words;
if there are two identical groups of words from the second set of groups of words, determining that the segment is the garbled suggestion; and
if there are no two identical groups of words from the second set of groups of words, determining that the segment is not the garbled suggestion.

* * * * *